(12) United States Patent
Grougan et al.

(10) Patent No.: US 7,239,958 B2
(45) Date of Patent: Jul. 3, 2007

(54) APPARATUS AND METHOD FOR DISCERNING A DRIVER'S INTENT AND FOR AIDING THE DRIVER

(75) Inventors: Paul A. Grougan, Novi, MI (US); Thomas C. Zebehazy, Rochester, MI (US)

(73) Assignee: General Motors Corporation, Detroit, MI (US)

( * ) Notice: Subject to any disclaimer, the term of this patent is extended or adjusted under 35 U.S.C. 154(b) by 441 days.

(21) Appl. No.: 10/739,615

(22) Filed: Dec. 18, 2003

(65) Prior Publication Data

US 2005/0137784 A1    Jun. 23, 2005

(51) Int. Cl.
*B62D 13/06* (2006.01)
*B60Q 1/22* (2006.01)
*G06F 17/00* (2006.01)

(52) U.S. Cl. .................. 701/200; 701/41; 701/301; 367/106; 367/130; 340/932.2

(58) Field of Classification Search ............... 701/200, 701/225, 207, 300, 301, 41; 367/99, 104, 367/106, 117, 118, 129, 130; 342/450; 340/431, 340/435, 436, 463, 903, 932.2; 180/167
See application file for complete search history.

(56) References Cited

U.S. PATENT DOCUMENTS

| | | | | |
|---|---|---|---|---|
| 3,893,068 A | * | 7/1975 | Tucker, Jr. | 340/431 |
| 4,063,240 A | * | 12/1977 | Isbister et al. | 342/21 |
| 4,214,266 A | * | 7/1980 | Myers | 348/140 |
| 4,240,152 A | * | 12/1980 | Duncan et al. | 367/108 |
| 4,974,215 A | * | 11/1990 | Bolz et al. | 367/108 |
| 5,004,997 A | * | 4/1991 | Shisgal et al. | 340/436 |
| 5,247,442 A | * | 9/1993 | Kendall | 701/41 |
| 5,357,432 A | * | 10/1994 | Margolis et al. | 701/23 |
| 5,574,426 A | * | 11/1996 | Shisgal et al. | 340/435 |
| 5,940,012 A | * | 8/1999 | Studebaker | 340/932.2 |
| 6,268,803 B1 | * | 7/2001 | Gunderson et al. | 340/903 |
| 6,480,104 B1 | * | 11/2002 | Wall et al. | 340/431 |
| 6,693,524 B1 | * | 2/2004 | Payne | 340/463 |
| 2003/0233189 A1 | * | 12/2003 | Hsiao et al. | 701/207 |
| 2005/0115753 A1 | * | 6/2005 | Pemberton et al. | 180/167 |

* cited by examiner

*Primary Examiner*—Tan Q. Nguyen
(74) *Attorney, Agent, or Firm*—Laura C. Hargitt

(57) ABSTRACT

Methods and apparatus are provided for determining the intent of a driver of a motor vehicle in moving a trailer towed by the motor vehicle along a desired path. The method comprises the step of positioning a first reference point at a first location spaced apart from the motor vehicle and sequentially positioning a second reference point at a plurality of way points along the desired point. A signal relative to the motor vehicle, the first reference point, and the plurality of way points is transmitted as the second reference point is positioned at each of the way points. The transmitted signals corresponding to each of the way points are received and are used to determine the position of the plurality of way points relative to the motor vehicle by a process of triangulation. The position of the plurality of way points indicate positions along the desired path.

22 Claims, 2 Drawing Sheets

APPARATUS AND METHOD FOR DISCERNING A DRIVER'S INTENT AND FOR AIDING THE DRIVER

TECHNICAL FIELD

The present invention generally relates to a method and apparatus for discerning a driver's intent, and more particularly relates to method and apparatus for discerning a driver's intent with respect to moving a trailer coupled to a motor vehicle and for aiding the driver in moving the trailer along a desired path.

BACKGROUND

Aids are available for guiding a driver, in a macroscopic sense, in moving a vehicle from point A to point B. These aids include, for example, GPS locating devices coupled to map libraries that will help in selecting a route and alerting the driver to turns that must be made along the route. The available aids, however, do not have sufficient resolution and cannot aid the driver in, for example, parking the motor vehicle. Further, the presently available aids are inadequate for aiding a driver in the more difficult tasks involved in moving a trailer coupled to a motor vehicle such as backing the trailer into a designated location.

Accordingly, it is desirable provide methods and apparatus that are capable of discerning a driver's intent as a driver prepares to move a trailer coupled to a motor vehicle. In addition, it is desirable to provide methods and apparatus for aiding a driver moving a trailer coupled to a motor vehicle along a desired path. Furthermore, other desirable features and characteristics of the present invention will become apparent from the subsequent detailed description and the appended claims, taken in conjunction with the accompanying drawings and the foregoing technical field and background.

BRIEF SUMMARY

An apparatus is provided for discerning a driver's intent relative to a desired path that a trailer coupled to a motor vehicle will travel. The apparatus comprises a first transmitter positioned at a fixed location spaced apart from the motor vehicle and configured to transmit a signal and a second transmitter configured to transmit a second signal at each of a plurality of way points along the desired path. The apparatus further comprises a receiver located in the motor vehicle and configured to receive the first and second signals. A calculating device is configured to calculate the location of the plurality of way points relative to the fixed location by a process of triangulation in response to the receiver receiving the first and second signals. The calculating device is further configured to calculate the location of the trailer relative to the plurality of calculated location of the way points as the motor vehicle and the trailer move along the desired path. A feedback display is configured to provide information to the driver of the motor vehicle relating to the location of the trailer relative to the plurality of way points.

A method is provided for determining the intent of a driver of a motor vehicle in moving a trailer towed by the motor vehicle along a desired path. The method comprises the step of positioning a first reference point at a first location spaced apart from the motor vehicle and sequentially positioning a second reference point at a plurality of way points along the desired point. A signal relative to the motor vehicle, the first reference point, and the plurality of way points is transmitted as the second reference point is positioned at each of the way points. The transmitted signals corresponding to each of the way points are received and are used to determine the position of the plurality of way points relative to the motor vehicle by a process of triangulation. The position of the plurality of way points indicate positions along the desired path.

BRIEF DESCRIPTION OF THE DRAWINGS

The present invention will hereinafter be described in conjunction with the following drawing figures, wherein like numerals denote like elements, and in which.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In accordance with the various embodiments of the invention, methods and apparatus are provided for discerning the intent of a driver and for aiding the driver in moving a trailer coupled to a motor vehicle along a desired path. For ease of description, the various embodiments of the invention will be illustrated with reference to one particular application, namely the backing a motor vehicle with an attached trailer along a exemplary path. The invention is not to be interpreted as being limited to this illustrative embodiment, however, as the invention is applicable to any movement of a trailer coupled to a motor vehicle along any desired path.

Figure 1:
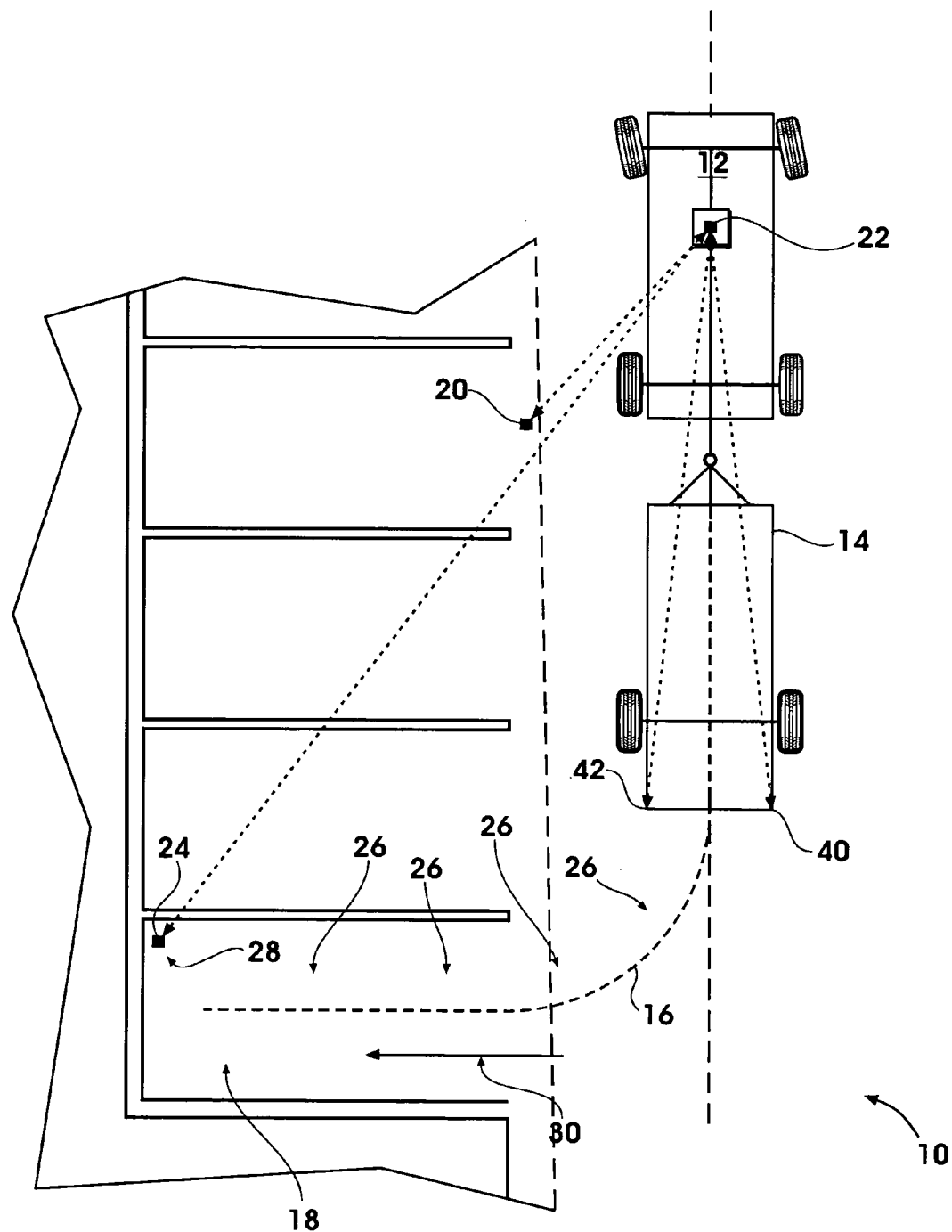
FIG. 1 illustrates schematically a system for practice of an embodiment of the invention.

FIG. 1 schematically illustrates aspects of a system 10 for practice of one embodiment of the invention. System 10 includes a motor vehicle 12 coupled to a trailer 14. The invention is not limited to any particular type of motor vehicle or any particular type of trailer. Motor vehicle 12 can be, for example a passenger car or a pickup truck and trailer 14 can be, for example, a boat trailer, camping trailer, or the like. Alternatively, motor vehicle 12 can be a tractor and trailer 14 can be a moving van or the like. The invention is thus useful to an average "citizen driver" as well as to a commercial driver. FIG. 1 illustrates a desired path 16 along which it is desired to back trailer 14 to a parking space 18 or the like. The exemplary desired path 16 is illustrated as a simple path having only a single curve, but the actual desired path may include more than one turn, for example, around various roadway obstacles. The method and apparatus in accordance with the invention are, of course, applicable to any path.

In accordance with one embodiment of the invention, a reference beacon 20 is placed at a location spaced apart from the motor vehicle. Once positioned, the reference beacon is not moved during the process of moving the motor vehicle and the trailer. The reference beacon includes a transmitter configured to transmit a signal to a receiver 22 located in the motor vehicle. The transmitter is preferably a radio frequency (RF) transmitter, but could also be a microwave transmitter, optical signal transmitter, or the like. Receiver 22 is an RF or other receiver configured to receive the signal transmitted from reference beacon 20. A target beacon 24, configured with a transmitter in a similar manner to the transmitter in the reference beacon, is moved along desired path 16, and preferably along an edge of the desired path. At a plurality of way points 26 (four way points are illustrated in FIG. 1) along the desired path, the transmitter in target beacon transmits a signal to receiver 22. The way points can indicate, for example, turns or curves in the desired path, the intended surface the trailer is intended to stay upon such as a driveway, garage, parking space, or the like, or obstacles the trailer must move around. With the transmission from the target beacon at each of way points 26, receiver 22 uses triangulation, based on the transmission from reference beacon 20 and the transmission from target beacon 24 to determine and calculate the coordinates of the way point relative to the position of the target beacon and the receiver in motor vehicle. The coordinates of each way point are stored in a memory (not illustrated) in the motor vehicle. The act of calculating to determine the coordinates by triangulation can be carried out by the engine control unit (ECU) of the motor vehicle or by other microprocessor, microcontroller, or the like. The memory for storage of the coordinates can be a dynamic random access memory (DRAM), Flash memory, electrically erasable programmable read only memory (EEPROM), or the like associated with the ECU or other calculating device. As used herein, the term "receiver" will be used to include the actual signal receiving device as well as the mechanism for calculating and storing the coordinates. The storage of the way points stores a record of the driver's intent for moving the trailer along the desired path. In accordance with one embodiment of the invention, the location of the final way point 28, the desired final destination for the trailer, is indicated to the motor vehicle by a transmission from that location and the target beacon then is positioned at the final way point where it continues to transmit a signal to receiver 22.

Figure 2:
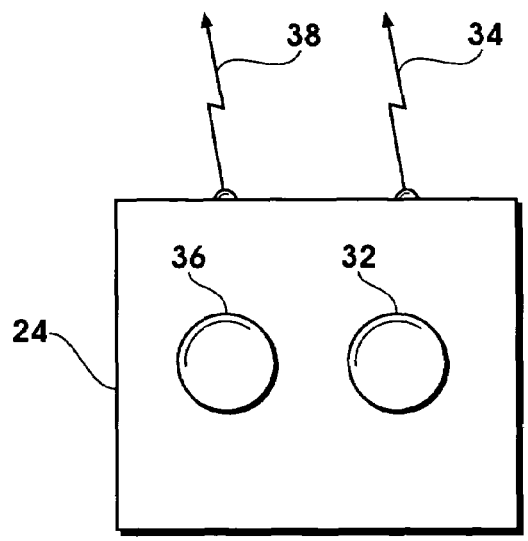
FIG. 2 illustrates schematically a target beacon device in accordance with another embodiment of the invention.

In accordance with a further embodiment of the invention and as illustrated in FIG. 2, and with continued reference to FIG. 1, target beacon 24 can be configured to transmit two different signals, one indicating a way point on the left side of the desired path (way points 26, for example) and a second indicating a way point 30 on the right side of the desired path. The two different signals can be transmitted, for example, in response to pushing different buttons on the target beacon. The target beacon can be configured so that pushing a "right" button 32 can cause transmission of one signal 34 whereas pushing of a "left" button 36 can cause transmission of a second signal 38. Receiver 22 is configured to interpret the two signals as indicating a left way point or a right way point, as the case may be. A target beacon configured to transmit two different signals as just described can also be used to locate the rear corners of the trailer relative to the motor vehicle. By positioning target beacon 24 proximate the right rear corner 40 of the trailer and pushing button 32 to transmit signal 34 to receiver 22, the receiver can use triangulation to calculate the coordinates of the right rear corner of the trailer. Similarly, the left rear corner 42 of the trailer can be located by positioning the target beacon proximate the left rear corner and pressing button 36 to transmit signal 38.

The location of the trailer corners, when combined with the articulation angle (the angle and location of the trailer tongue with respect to the motor vehicle), can be used to establish a trailer model. The manufacturer of the motor vehicle is familiar with the motor vehicle and can construct and will have a model of the motor vehicle. The manufacturer of the motor vehicle, however, may not have a model of the trailer because it is not manufactured by the motor vehicle manufacturer. Additionally, different trailers requiring different models may be coupled to the motor vehicle on different occasions. Knowing the location of the trailer corners and other relevant information allows establishment of a trailer model which, in conjunction with the motor vehicle model, can be used to resolve the position of the trailer along the desired path and can provide the driver, in accordance with a further embodiment of the invention, with assistance in moving the trailer along the desired path. As the driver begins to move the motor vehicle and the trailer along the desired path, the reference beacon and the target beacon, the latter now positioned at the terminus of the desired path, continue to transmit signals to the receiver located in the motor vehicle. By using the trailer model and by triangulation using the signals from the reference beacon and the target beacon, the receiver can determine the coordinates of at least one of the corners of the trailer at all times and can compare those coordinates with the coordinates of the way points that are stored in memory. In this manner, the receiver can determine at all times the position of the trailer relative to the desired path.

Figure 3:
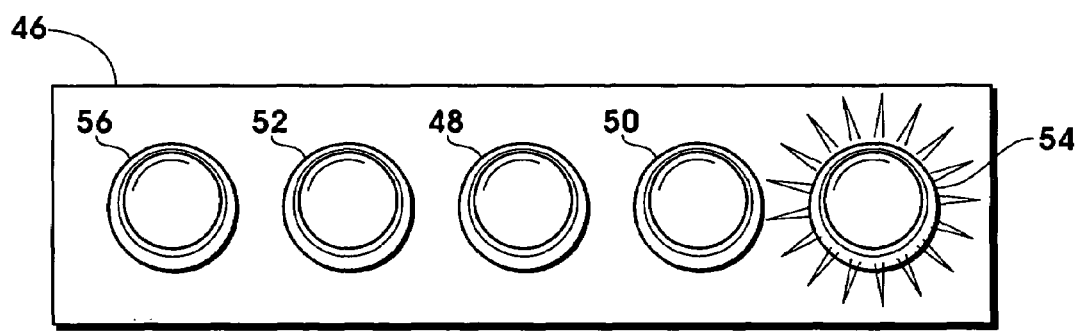
FIG. 3 illustrates one embodiment of a visual feedback device.

In accordance with yet another embodiment of the invention, feedback can be provided to the driver to indicate the progress of the trailer with respect to the desired path. The feedback can be in the form of a visual display or an audible display. For example, as illustrated in FIG. 3, a visual display 46 can include a central green light 48 flanked on either side by first a pair of orange lights 50, 52, and then by a second pair of red lights 54, 56. If the trailer is moving along the desired path, the center green light will be illuminated. If however, the trailer is moving to the right or left of the desired path, the orange lights 50 or 52 would be illuminated to indicate that the trailer was inclined along the left or right edge of the desired path. Similarly, if the trailer is moving off the desired path either the right (as illustrated) or left red light 54, 56 will be illuminated. Of course the color and number of lights is purely a matter of choice. Alternatively, an audible alert (not illustrated) can be used to provide feedback to the driver. For example, if the trailer is moving properly along the desired path, the audible alert will be silent. If, however, the trailer is moving off to either the right or to the left of the desired path, a record message such as "right" or "left" could be announced to the driver.

As described above, reference beacon 20 and target beacon 24 each include a transmitter and the motor vehicle is provided with a receiver 22. In accordance with other embodiments of the invention, the roles of beacon and motor vehicle can be interchanged with respect to the location of transmitter and receiver. That is, for example, reference beacon 20 and the motor vehicle can be provided with transmitters and the target beacon can be configured to include a receiver, calculating device, and memory storage. Any such combination of transmitters and receivers can be employed as long as triangulation can be used to establish the coordinates of the way points in discerning the driver's intent and in determining the coordinates of the trailer in aiding the driver as the trailer is moved along the desired path.

While at least one exemplary embodiment has been presented in the foregoing detailed description, it should be appreciated that a vast number of variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing the exemplary embodiments. It should be understood that various changes can be made in the function and arrangement of elements without departing from the scope of the invention as set forth in the appended claims and the legal equivalents thereof.

What is claimed is:

1. A method for creating a path to assist a driver in parking a trailer coupled to a motor vehicle, the method comprising the steps of:
   transmitting a first signal from a first transmitter located at a fixed first position to a receiver located in the motor vehicle while the motor vehicle is located at a stationary second position;
   transmitting a plurality of second signals from a second transmitter to the receiver while the motor vehicle is located at the second position, each of the plurality of second signals transmitted from a different way point to define the path; and
   determining a location of each way point relative to the first position and the second position using triangulation based on the first signal and the plurality of second signals.

2. The method of claim 1 further comprising the steps of:
   transmitting a third signal from the second transmitter to the receiver while the second transmitter is positioned proximate a rear corner of the trailer and while the motor vehicle is located at the second position.

3. The method of claim 2 further comprising the step of triangulating the first signal and the third signal to calculate a third position of the rear corner relative to the first position, the second position, and the location of each way point.

4. The method of claim 3 further comprising the steps of:
   calculating a current position of the rear corner as the motor vehicle is moved along the path;
   calculating the location of the way points relative to the current position as the motor vehicle is moved along the path; and
   informing the driver of the current position relative to the location of the way points.

5. The method of claim 3 wherein the step of transmitting a plurality of second signals comprises the step of transmitting a plurality of second signals, one of the plurality of second signals transmitted from each of a plurality of way points located relative to an intended path of one of the first and second rear corners.

6. The method of claim 1 further comprising the steps of:
   positioning the second transmitter at a third position spaced apart from the first position and from the second position after the step of transmitting the plurality of second signals; and
   transmitting third signals from the second transmitter to the receiver while the motor vehicle is moving along the path to determine a current position of the motor vehicle.

7. The method of claim 6 further comprising the steps of:
   transmitting fourth signals from the first transmitter to the receiver while the motor vehicle is moving;
   determining a current position of the trailer as the motor vehicle travels along the path by triangulating the fourth signals and the third signals; and
   calculating a current position of the trailer relative to the position of the plurality of way points.

8. The method of claim 7 further comprising the step of providing feedback to the driver indicating position of the trailer relative to the position of the plurality of way points.

9. A method for creating a path to assist a driver in parking a motor vehicle the method comprising the steps of:
   positioning a first reference point at a fixed first location spaced apart from the motor vehicle;
   sequentially positioning a second reference point at a plurality of way points along the path;
   transmitting a first signal from the fixed first location to the motor vehicle while the motor vehicle is stationary;
   transmitting a second signal from each of the plurality of way points to the motor vehicle while the motor vehicle is stationary;
   receiving the transmitted signals; and
   using triangulation based on the first signal and the second signals to determine a position of each way point relative to the motor vehicle.

10. The method of claim 9 further comprising the step of fixing a third reference point at a second location spaced apart from the first location and from the motor vehicle.

11. The method of claim 10 further comprising the step of using triangulation to determine the position of the trailer relative to the first location and the second location as the motor vehicle is moved along the path.

12. The method of claim 11 further comprising the step of calculating the position of the trailer relative to the plurality of way points.

13. The method of claim 12 further comprising the step of providing feedback information in response to calculating the position of the trailer relative to the plurality of way points to direct a driver of the motor vehicle.

14. A method for assisting a driver in parking a trailer coupled to a motor vehicle comprising the steps of:
   positioning a first beacon at a first fixed location spaced apart from the motor vehicle;
   moving a second beacon along a path including a plurality of way points defining the path;
   triangulating signals transmitted from the first beacon and the second beacon to determine the coordinates of the plurality of way points relative to the first beacon and the motor vehicle;
   transmitting signals from predetermined elements of the trailer to the motor vehicle to determine a position of the elements relative to the motor vehicle and the first beacon;
   positioning the second beacon at a second fixed location spaced apart from the first fixed location and from the motor vehicle;
   determining the location of the predetermined elements as the motor vehicle moves along the desired path by triangulation;
   calculating a position of the predetermined elements relative to the plurality of way points as the motor vehicle moves along the path; and
   providing feedback information to the driver in response to the step of calculating.

15. The method of claim 14 wherein the step of providing feedback information comprises the step of providing visual feedback information.

16. The method of claim 14 wherein the step of providing feedback information comprises the step of providing audible feedback information.

17. The method of claim 14 wherein the step of determining the location of predetermined elements comprises the steps of:
   determining the location of a right rear corner of the trailer and of a left rear corner of the trailer by positioning the second beacon proximate the right rear corner and transmitting a first signal and positioning the second beacon proximate the left rear corner and transmitting a second signal; and receiving the first and second signals and using triangulation to determine the coordinates of the right rear corner and the left rear corner, respectively, relative to the motor vehicle.

18. The method of claim 17 further comprising the step of constructing a model of the trailer relative to the motor vehicle in response to determining the location of the right rear corner of the trailer and the left rear corner of the trailer.

19. A system for creating a path to assist a driver in parking a trailer coupled to a motor vehicle comprising:
  a first transmitter positioned at a fixed location spaced apart from the motor vehicle and configured to transmit a first signal to the motor;
  a second transmitter configured to transmit a second signal at each of a plurality of way points defining the path;
  a receiver located in the motor vehicle and configured to receive the first signal and the second while the motor vehicle is stationary;
  a calculating device configured to calculate a location of the plurality of way points relative to the fixed location by triangulation in response to the receiver receiving the first signal and the second signals, the calculating device further configured to calculate a location of the trailer relative to the plurality of calculated locations of the way points as the motor vehicle and the trailer move along the path; and
  a feedback display configured to provide information to a driver of the motor vehicle relating to the location of the trailer relative to the plurality of calculated locations of the way points.

20. The system of claim 19 wherein the calculating device comprises an engine control unit integral with the motor vehicle.

21. The system of claim 19 wherein the feedback device comprises a visual display visible to a driver of the motor vehicle.

22. The system of claim 19 wherein the feedback device comprises an audible device configured to emit an audible signal discernable by a driver of the motor vehicle if the trailer is not moving along the path.

* * * * *